United States Patent

Kaneyoshi et al.

Patent Number: 5,545,386
Date of Patent: Aug. 13, 1996

[54] METHOD FOR THE PREPARATION OF GLOBULAR PARTICLES OF A RARE EARTH OXIDE

[75] Inventors: Masami Kaneyoshi; Shigeru Sakai, both of Fukui-ken, Japan

[73] Assignee: Shin-Etsu Chemical Co., Ltd., Tokyo, Japan

[21] Appl. No.: 529,640

[22] Filed: Sep. 18, 1995

[30] Foreign Application Priority Data

Oct. 21, 1994 [JP] Japan .................................. 6-256434

[51] Int. Cl.$^6$ .................................................. C01F 17/00
[52] U.S. Cl. .................................................. 423/263
[58] Field of Search .................................. 423/593, 598, 423/263

[56] References Cited

U.S. PATENT DOCUMENTS 4,778,671  10/1988  Wusirika .................................. 423/598
5,196,388  3/1993  Shyu .

FOREIGN PATENT DOCUMENTS 0253552  1/1988  European Pat. Off. .
1208565  10/1970  United Kingdom .

OTHER PUBLICATIONS

Journal of Materials Science Letters, Jun. 1, 1992, No. 11, London, GB.

Primary Examiner—Wayne Langel
Attorney, Agent, or Firm—Wenderoth, Lind & Ponack

[57] ABSTRACT

Proposed is a method for the preparation of a rare earth oxide powder consisting of particles having a globular particle configuration to be suitable as a base material of phosphors. The method comprises the steps of mixing an aqueous solution of a rare earth salt and an aqueous alkaline solution, e.g., ammonia water, to precipitate a rare earth hydroxide which is collected, washed with water and calcined to be converted into the oxide powder. Characteristically, the precipitation reaction of the rare earth hydroxide is carried out in the presence of a nitrogen-containing chelating agent such as triethanolamine in the aqueous medium in a controlled amount.

10 Claims, No Drawings

METHOD FOR THE PREPARATION OF GLOBULAR PARTICLES OF A RARE EARTH OXIDE

BACKGROUND OF THE INVENTION

The present invention relates to a method for the preparation of globular particles of a rare earth oxide. More particularly, the invention relates to a method for the preparation of rare earth oxide particles having an outstandingly globular particle configuration and suitable as a base material for the preparation of various kinds of phosphors.

While rare earth oxides in the form of a powder are widely used as a base material of various kinds of phosphors in fluorescent lamps, cathode ray tubes and the like, it is known that the particles of a phosphor powder should desirably have a particle configuration as close to spherical as possible in order that the phosphor composition prepared therefrom may exhibit good workability in the coating works and a high efficiency of luminescence. In view of this requirement, various attempts and proposals have been made heretofore to provide a method for the preparation of a rare earth oxide powder having a spherical or globular particle configuration because it is empirically known that, when a rare earth oxide powder having a globular particle configuration is used as the base material of a phosphor, which is prepared by mixing the rare earth oxide powder with other starting materials and a flux followed by calcination of the mixture, the particle configuration of the phosphor powder can also be globular.

For example, Japanese Patent Kokai 3-23214 discloses a method according to which globular particles of a rare earth oxide can be obtained by granulation of very fine particles of the oxide. This method of granulation, however, is not applicable to the preparation of a rare earth oxide powder suitable as the base material of a phosphor because the particles obtained by this method is too coarse usually having a diameter of 20 µm or even larger to exceed the suitable range of particle diameter as the base material of a phosphor.

Further, Japanese Patent Kokai 3-27117 and 3-27118 each disclose a method for the preparation of globular particles of a rare earth oxide which can be obtained by the calcination of a specifically prepared rare earth oxalate powder having a globular particle configuration. A problem in these methods is that the precipitation reaction of the rare earth oxalate must be conducted at a low temperature and dehydration and drying of the oxalate powder must be performed under specifically controlled conditions so that the productivity of the process is not high enough.

SUMMARY OF THE INVENTION

The present invention accordingly has an object to provide a novel and very efficient method for the preparation of a rare earth oxide powder having a globular particle configuration and suitable as a base material of a phosphor.

Thus, the method of the present invention for the preparation of a rare earth oxide powder having a globular particle configuration comprises the steps of:

(a) preparing an aqueous solution of a water-soluble compound of a rare earth element;

(b) mixing the aqueous solution prepared in step (a) with an aqueous alkaline solution selected from the group consisting of ammonia water and aqueous solutions of an alkali metal hydroxide to form precipitates of a rare earth hydroxide in an aqueous medium in the presence of a chelating agent having at least one nitrogen atom in a molecule capable of forming a coordinate bond with the ion of the rare earth element;

(c) separating the precipitates of the rare earth hydroxide from the aqueous medium; and (d) calcining the precipitates of the rare earth hydroxide at a temperature in the range from 600° C. to 1500° C.

DETAILED DESCRIPTION OF THE PREFERRED EMBODIMENTS

As is understood from the above given summarizing description, the method of the present invention basically utilizes the well known method of converting a rare earth hydroxide into a rare earth oxide powder by calcination while the inventive method is characterized by the specific and very unique conditions for the preparation of the rare earth metal hydroxide by alkalifying an aqueous solution of a rare earth salt with ammonia or an alkali metal hydroxide.

The above mentioned inventive method is applicable to the preparation of an oxide of any rare earth element including yttrium and the elements having an atomic number in the range from 57 to 71. More particularly, quite satisfactory results can be obtained by the application of the inventive method to the preparation of an oxide of a rare earth element including yttrium and those having an atomic number of 63 to 71. If necessary, two kinds or more of these rare earth elements can be used in combination.

The "globular" particle of a rare earth oxide implied here means a particle which is not flaky or acicular but has a consolidated configuration having a ratio of the longest diameter to the shortest diameter not exceeding 1.5 while the powder consists of discrete particles and not of agglomerates.

In step (a) of the inventive method, an aqueous solution of a water-soluble compound or salt of a rare earth element, referred to as the solution A hereinafter, is prepared. The water-soluble rare earth salt suitable for use in the inventive method includes chlorides and nitrates of the rare earth element though not particularly limitative thereto. The concentration of the rare earth salt in the solution A should be in the range from 0.5 mole/liter to the saturation concentration. When the concentration of the rare earth salt is too low in the solution A, the precipitates of the rare earth hydroxide formed by alkalifying with ammonia or an alkali metal hydroxide in the presence of a chelating agent are in a gelatinous form with very poor filtrability, from which globular particles of the rare earth oxide cannot be obtained by calcination. In particular, the concentration of the rare earth salt in the solution A is selected in consideration of the balance with the concentration and volume of the ammonia water or the aqueous solution of an alkali metal hydroxide to be mixed together in step (b) of the inventive method in such a way that the content of the rare earth element in the mixture after mixing of the solutions is in the range from 0.3 to 2.0 moles/liter or, preferably, in the range from 0.5 to 1.7 moles/liter. When the content of the rare earth element is too high, a difficulty is caused in handling of the aqueous slurry containing a so large amount of the precipitates of the rare earth hydroxide due to the excessively high consistency of the slurry while, when the content of the rare earth element in the precipitation medium is too low, a decrease is caused in the productivity of the process due to the unduly large volume of the solutions or the aqueous slurry.

In step (b) of the inventive method, the above described solution A is admixed with ammonia water or an aqueous solution of an alkali metal hydroxide, referred to as the solution B hereinafter, which serves as a precipitant for the rare earth ions in the solution A to give a rare earth hydroxide. Since it is usual that an alkali metal impurity in the rare earth oxide powder has an adverse influence on the quality of the phosphor prepared from the rare earth oxide, ammonia water is preferred to the aqueous solution of an alkali metal hydroxide. The concentration of ammonia or alkali metal hydroxide in the ammonia water, i.e. solution B, is in the range from 0.9 to 16 moles/liter. The amount of ammonia in the solution B is in the range from 3 to 5 moles per mole of the rare earth salt in the solution A. When the amount of ammonia or alkali metal hydroxide is too small, precipitation of the rare earth hydroxide cannot be complete to decrease the yield of the hydroxide while no particular additional advantage is obtained by increasing the amount thereof to exceed the above mentioned upper limit.

While it is conventional that a rare earth hydroxide can be precipitated when the solution A, i.e. an aqueous solution of a rare earth salt, is alkalified by mixing with the solution B, e.g., ammonia water, the most characteristic feature of the inventive method consists in that the precipitation reaction of the rare earth hydroxide is carried out in the presence of a specific chelating agent, which is a compound having at least two ligands in a molecule to form a chelate compound with a metal ion by coordinate bonding, including at least one nitrogen atom as the ligand in a molecule which is capable of forming a coordinate bond with the rare earth ion. Examples of the chelating agent suitable for use in the inventive method include ethylenediamine, diethylene triamine, ethylenediamine tetraacetic acid, nitrilotriacetic acid, glycine, 2-amino-ethyl alcohol, diethanolamine, triethanolamine and the like, of which ethanolamine compounds such as triethanolamine are preferable in respect of the relatively low cost and high safety. The amount of the chelating agent, which should be present in the medium for the precipitation reaction of the rare earth hydroxide, is in the range from 0.2 to 2.0 moles per mole of the rare earth salt in the solution A. When the amount thereof is too small, the desired effect to be obtained by the use of a chelating agent cannot be fully obtained as a matter of course while no particular additional advantages can be obtained by increasing the amount of the chelating agent to exceed the above defined upper limit sometimes rather with a disadvantage of a decrease in the yield of the rare earth hydroxide due to incomplete precipitation if not to mention the disadvantage due to the increase in the cost for the chelating agent.

Since the only requirement for the chelating agent in the inventive method is that the chelating agent is present in the precipitation reaction of the rare earth hydroxide, the chelating agent can be introduced into the precipitation medium in several different ways. Namely, the chelating agent can be added to and dissolved in the solution A and/or the solution B before mixing of the solutions. It is further optional that the solution A is added to the solution B or vice versa. The most preferable way in respect of the particle configuration, however, is that the chelating agent is dissolved in the solution B, e.g., ammonia water, and the solution A, i.e. an aqueous solution of the rare earth salt, is added to the solution B containing the chelating agent under agitation. No particular temperature control is required in the mixing procedure of the solutions A and B which can be performed successfully at room temperature. Heating or cooling of the solutions gives no particular advantages. Rather, the temperature should be kept low when the solution B is an ammonia water because of the possible dissipation loss of ammonia at an elevated temperature.

It has been found that the velocity of mixing of the solutions has some influences on the particle size of the precipitates and the particle diameter is larger when the velocity of mixing is lower or the length of time taken for mixing is longer. No globular particles can be obtained at a too high velocity of mixing. As a rough measure, particles having an average particle diameter of 10 μm or smaller can be obtained by the addition of the solution A to the solution B containing the chelating agent taking a time in the range from 5 to 120 minutes assuming a uniform rate of addition under agitation.

The precipitates of the rare earth hydroxide obtained in step (b) described above in the form of an aqueous slurry are then separated in step (c) from the aqueous medium by a suitable solid-liquid separating means such as filtration. If the aqueous slurry is too alkaline, it is advantageous to neutralize the aqueous slurry by the addition of a small amount of an organic or inorganic acid prior to filtration in order to improve the filtrability.

The thus obtained rare earth hydroxide, which naturally contains the chelating agent, is then washed with water and dried before calcination in step (d) which is performed in air at a temperature of 600° to 1500° C. to give a rare earth oxide powder having a globular particle configuration The calcination is complete usually within 180 minutes though dependent on the temperature.

In the following, the method of the present invention is described in more detail by way of examples and comparative examples, which, however, never limit the scope of the invention in any way.

EXAMPLE 1

Into a beaker of 1 liter capacity were taken 140 ml of 28% ammonia water and 90 g of triethanolamine and they were mixed together to form a uniform solution into which 280 ml of an aqueous solution of yttrium nitrate in a concentration of 1.8 moles/liter were introduced dropwise over a period of 20 minutes under agitation at room temperature followed by further continued agitation for additional 5 minutes so that an aqueous slurry of yttrium hydroxide was obtained. Thereafter, the aqueous slurry was filtered by using a Buchner funnel to collect the precipitates which were washed with 500 ml of deionized water. The yttrium hydroxide was transferred into a porcelain crucible and calcined in an electric furnace under the atmospheric air according to such a temperature schedule that the temperature was first increased up to 900° C. by taking one hour and this temperature was maintained for one hour followed by spontaneous cooling to room temperature to give 56.3 g of yttrium oxide.

The thus obtained yttrium oxide powder had an average particle diameter $D_{50}$ of 3.9 μm, which meant that particles having a diameter not exceeding 3.9 μm occupied a 50% fraction of the volume, as determined on a Coulter Counter (a tradename of a product by Coulter Co.). Further, the electron microscopic observation of the powder revealed that the powder consisted of discrete, non-agglomerated particles each having a globular particle configuration.

EXAMPLE 2

The experimental procedure was substantially the same as in Example 1 excepting replacement of 280 ml of the 1.8 moles/liter aqueous solution of yttrium nitrate with the same volume of an aqueous solution of gadolinium nitrate in the same molar concentration to obtain 90.4 g of a gadolinium oxide powder. The thus obtained gadolinium oxide powder had an average particle diameter $D_{50}$ of 3.8 μm. Further, the electron microscopic observation of the powder revealed that the powder consisted of discrete, non-agglomerated particles each having a globular particle configuration.

EXAMPLE 3

The experimental procedure was substantially the same as in Example 1 excepting replacement of 140 ml of the 28% ammonia water with 180 ml of a 10 moles/liter aqueous solution of sodium hydroxide to obtain 56.2 g of a yttrium oxide powder. The thus obtained yttrium oxide powder had an average particle diameter $D_{50}$ of 4.1 μm. Further, the electron microscopic observation of the powder revealed that the powder consisted of discrete, non-agglomerated particles each having a globular particle configuration.

COMPARATIVE EXAMPLE 1

The procedure for the precipitation of yttrium hydroxide was carried out in just the same manner as in Example 1 excepting omission of the triethanolamine in the ammonia water. The yttrium hydroxide in the thus obtained aqueous slurry was in a gelatinous form so that a great difficulty was encountered in the filtration of the aqueous slurry. A small portion of the slurry was taken and processed in the same manner as in Example 1 to give a yttrium oxide powder which, however, consisted of coarse and irregularly angular particles having a particle diameter exceeding several tens of μm. Electron microscopic examination of the powder under high magnification revealed that the powder consisted of agglomerates of very fine particles having a particle diameter of 0.5 μm or smaller.

COMPARATIVE EXAMPLE 2

The procedure for the precipitation of yttrium hydroxide was carried out in just the same manner as in Example 1 excepting omission of the triethanolamine in the ammonia water and dilution of 140 ml of the 28% ammonia water with addition of 450 ml of deionized water. The yttrium hydroxide in the thus obtained aqueous slurry was in a gelatinous form so that a great difficulty was encountered in the filtration of the aqueous slurry. A small portion of the slurry was taken and processed in the same manner as in Example 1 to give a yttrium oxide powder which, however, consisted of coarse and irregularly angular particles having a particle diameter exceeding several tens of μm. Electron microscopic examination of the powder under high magnification revealed that the powder consisted of agglomerates of very fine particles having a particle diameter of 0.5 μm or smaller.

COMPARATIVE EXAMPLE 3

Into a beaker of 3 liter capacity were taken 140 ml of 28% ammonia water, 2200 ml of deionized water and 90 g of triethanolamine and they were mixed together to form a uniform solution into which 280 ml of an aqueous solution of yttrium nitrate in a concentration of 1.8 moles/liter were introduced dropwise over a period of 20 minutes under agitation at room temperature followed by further continued agitation for additional 5 minutes so that an aqueous slurry of yttrium hydroxide was obtained. The yttrium hydroxide in the thus obtained aqueous slurry was in a gelatinous form so that a great difficulty was encountered in the filtration of the aqueous slurry. A small portion of the slurry was taken and processed in the same manner as in Example 1 to give a yttrium oxide powder which, however, consisted of coarse and irregularly angular particles having a particle diameter exceeding several tens of μm. Electron microscopic examination of the powder under high magnification revealed that the powder consisted of agglomerates of very fine particles having a particle diameter of 0.5 μm or smaller.

What is claimed is:

1. A method for the preparation of a rare earth oxide powder having a globular particle configuration which comprises the steps of:
    (a) preparing an aqueous solution of a water-soluble salt of a rare earth element;
    (b) mixing the aqueous solution prepared in step (a) with ammonia water, in which the concentration of ammonia in the ammonia water is in a range of from 0.9 to 16 moles/liter, to form precipitates of a rare earth hydroxide in an aqueous medium in the presence of a chelating agent having at least one nitrogen atom in a molecule capable of forming a coordinate bond with the ion of the rare earth element;
    (c) separating the precipitates of the rare earth hydroxide from the aqueous medium by means of filtration; and
    (d) calcining the precipitates of the rare earth hydroxide at a temperature in the range from 600° C. to 1500° C.

2. The method for the preparation of a rare earth oxide powder having a globular particle configuration as claimed in claim 1 in which the water-soluble salt of a rare earth element is a chloride or nitrate of the rare earth element.

3. The method for the preparation of a rare earth oxide powder having a globular particle configuration as claimed in claim 1 in which the concentration of the water-soluble salt of the rare earth element in the aqueous solution prepared in step (a) is at least 0.5 mole/liter.

4. The method for the preparation of a rare earth oxide powder having a globular particle configuration as claimed in claim 1 in which the amount of ammonia in the ammonia water is in the range from 3 to 5 moles per mole of the rare earth salt in the aqueous solution prepared in step (a).

5. The method for the preparation of a rare earth oxide powder having a globular particle configuration as claimed in claim 1 in which the amount of the water-soluble salt of the rare earth element in the aqueous solution prepared in step (a) is in the range from 0.3 to 2.0 moles per liter of the total volume of the aqueous solution prepared in step (a) and the ammonia water used in step (b).

6. The method for the preparation of a rare earth oxide powder having a globular particle configuration as claimed in claim 1 in which the chelating agent is contained in the ammonia water and the aqueous solution of the water-soluble rare earth salt is added to the ammonia water containing the chelating agent.

7. The method for the preparation of a rare earth oxide powder having a globular particle configuration as claimed in claim 1 in which the aqueous solution of the water-soluble rare earth salt is added to the ammonia water containing the chelating agent over a period of time in the range from 5 to 120 minutes.

8. The method for the preparation of a rare earth oxide powder having a globular particle configuration as claimed in claim 1 in which the chelating agent is selected from the group consisting of ethylenediamine, diethylene triamine, ethylenediamine tetraacetic acid, nitrilotriacetic acid, glycine, 2-aminoethyl alcohol, diethanolamine and triethanolamine.

9. The method for the preparation of a rare earth oxide powder having a globular particle configuration as claimed in claim 8 in which the chelating agent is selected from the group consisting of 2-aminoethyl alcohol, diethanolamine and triethanolamine.

10. The method for the preparation of a rare earth oxide powder having a globular particle configuration as claimed in claim 1 in which the amount of the chelating agent is in the range from 0.2 to 2.0 moles per mole of the water-soluble rare earth salt in the aqueous solution prepared in step (a).

* * * * *